(12) United States Patent  
Markusic et al.

(10) Patent No.: US 8,573,639 B1  
(45) Date of Patent: Nov. 5, 2013

(54) INFLATABLE SIDE RESTRAINT ASSEMBLY

(75) Inventors: Craig A. Markusic, Marysville, OH (US); Bryant S. Whitcomb, Dublin, OH (US); Douglas McLeish, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/535,721

(22) Filed: Jun. 28, 2012

(51) Int. Cl.
*B60R 21/16* (2006.01)

(52) U.S. Cl.
USPC ...................................................... 280/730.2

(58) Field of Classification Search
USPC ...................................................... 280/730.2
See application file for complete search history.

(56) References Cited

U.S. PATENT DOCUMENTS

| | | | |
|---|---|---|---|
| 5,575,497 A * | 11/1996 | Suyama et al. | 280/730.1 |
| 5,588,672 A * | 12/1996 | Karlow et al. | 280/730.2 |
| 5,788,270 A * | 8/1998 | HÅland et al. | 280/729 |
| 6,099,029 A * | 8/2000 | HÅland et al. | 280/729 |
| 6,123,355 A * | 9/2000 | Sutherland | 280/728.2 |
| 6,457,740 B1 * | 10/2002 | Vaidyaraman et al. | 280/730.2 |
| 6,648,368 B2 | 11/2003 | Smith | |
| 6,695,341 B2 | 2/2004 | Winarto | |
| 6,848,708 B2 | 2/2005 | Green | |
| 7,469,923 B2 | 12/2008 | Ryan | |
| 7,819,422 B2 | 10/2010 | Umeda | |
| 7,988,187 B2 | 8/2011 | Yamamura | |
| 8,033,569 B2 * | 10/2011 | Yamanishi et al. | 280/730.2 |
| 8,056,924 B2 * | 11/2011 | Hatfield et al. | 280/730.2 |
| 2005/0082797 A1 | 4/2005 | Welford | |
| 2010/0264630 A1 * | 10/2010 | Walston | 280/730.2 |

FOREIGN PATENT DOCUMENTS

| | | | | | |
|---|---|---|---|---|---|
| JP | 2001163161 A | * | 6/2001 | | B60R 21/22 |
| JP | 2004189099 A | * | 7/2004 | | B60R 21/16 |
| JP | 2004210171 A | * | 7/2004 | | B60R 21/16 |

* cited by examiner

*Primary Examiner* — Faye M. Fleming

(74) *Attorney, Agent, or Firm* — Fay Sharpe LLP

(57) ABSTRACT

An inflatable side restraint assembly for a vehicle includes a sail panel selectively deployed in the vehicle. The sail panel covers front and rear side window regions of the vehicle and includes an inflatable region located along a first pillar region between adjacent first and second windows when the sail panel is deployed. Likewise, a second inflatable region is located along a second pillar region between adjacent second and third side windows. An additional inflatable region extends in a direction generally perpendicular to the inflatable region, preferably located along a lower region of the sail panel. A deployable head-upper thorax restraint is configured to deploy between the sail panel and an outer end of a seat row in the vehicle, and preferably is provided at each end of each row of seats in the vehicle.

18 Claims, 6 Drawing Sheets

INFLATABLE SIDE RESTRAINT ASSEMBLY

BACKGROUND

This disclosure relates to an assembly for a vehicle that improves occupant ejection mitigation and impact protection capabilities. More particularly, the present disclosure relates to an inflatable side restraint assembly that can provide rollover, head, and upper thorax protection for multiple rows of an automotive vehicle, and will be described with particular reference thereto, although selected aspects of the disclosure may find application in related environments and applications.

Inflatable restraint devices are commonly used in today's automotive vehicles. Typically, at least some portion of the restraint device is selectively inflated in the event of an accident. More particularly, a sensor(s) measures abnormal deceleration and coordinates with one or more inflation devices or inflators to selectively deploy a curtain(s) and/or inflatable member(s). It is common to use an inflatable curtain mounted to an inner roof side rail that deploys through the roof liner in the event of a side crash event. The inflatable curtain enhances protection for an occupant's head and limits the potential for the occupant making direct contact with an interior of the vehicle. Further, the inflatable curtain also limits the potential for the occupant to make contact with an object external to the vehicle.

The curtain is usually designed to unfold, unroll, i.e. deploy downwardly, to inflate an airbag. Commonly, a side curtain design provides head and neck protection to the vehicle occupant. These side curtain structures are usually mounted in the roof rail. An inflatable curtain is mounted to an inner roof side rail that deploys through the roof liner in the event of a side crash and thus helps protect an occupant's head. A separate side airbag system is sometimes mounted in the seat to provide additional protection, i.e. particularly provides for upper thorax protection for the occupant. As a result, the side restraint system becomes undesirably complex, encounters the prospect for an inadvertent seat-mounted side air bag event, and also hinders development of the seat. Additionally, each of cost, assembly, and complexity increase because of the need to add additional independent side airbag modules for each row of the vehicle with such a system.

Consequently, a need exists for a side curtain airbag system that can provide rollover, head, and upper thorax protection for all three rows of a vehicle in a manner that is simpler and more economical.

SUMMARY

An improved inflatable side restraint assembly for a vehicle is provided.

The inflatable side restraint assembly in one preferred embodiment includes a sail panel or curtain selectively deployed in the vehicle to substantially cover at least front and rear side window regions of the vehicle. At least one inflatable region of the sail panel is substantially located along a first pillar region between adjacent first and second side windows when the sail panel is deployed.

The at least one inflatable region of the sail panel further includes a second inflatable region substantially located along a second pillar region spaced from the first pillar region and located between the second window and adjacent third window.

An additional inflatable region extends in a direction generally perpendicular to the at least one inflatable region.

The additional inflatable region is preferably located along a lower region of the sail panel when the sail panel is deployed.

The at least one inflatable region of the sail panel is in fluid communication with the at least one inflatable region.

At least one deployable head-upper thorax restraint is configured to deploy between the sail panel and an outer end of at least one seat row in the vehicle.

One embodiment of the head-upper thorax restraint includes an inflatable cushion.

A method of protecting a vehicle occupant during a side crash event includes selectively deploying a sail panel to cover at least front and rear side window regions of a vehicle. The method further includes inflating at least a region of the sail panel located in an area along a first pillar region between first and second windows when the sail panel is deployed.

The method additionally includes inflating a second region of the sail panel that extends in a direction generally perpendicular to the at least one inflatable region, and preferably along a lower region of the sail panel when the sail panel is deployed.

The method further includes inflating a head and upper torso cushion between the sail panel and an interior of the vehicle.

A primary benefit of the disclosure relates to the ability to provide improved protection for the vehicle occupant.

Another advantage resides in the ability to provide both support for the head and at least an upper torso of a vehicle occupant, as well as rollover ejection protection.

Still another benefit is associated with providing independent head-upper torso restraint and cushions for three rows in the vehicle.

Yet another advantage results from deploying through the headliner of the vehicle only and not over the garnish to provide a trajectory control and quickly deploy the inflatable side restraint system.

Still other benefits and advantages of the disclosure will become apparent upon reading and understanding the following detailed description.

DETAILED DESCRIPTION

Figure 1:
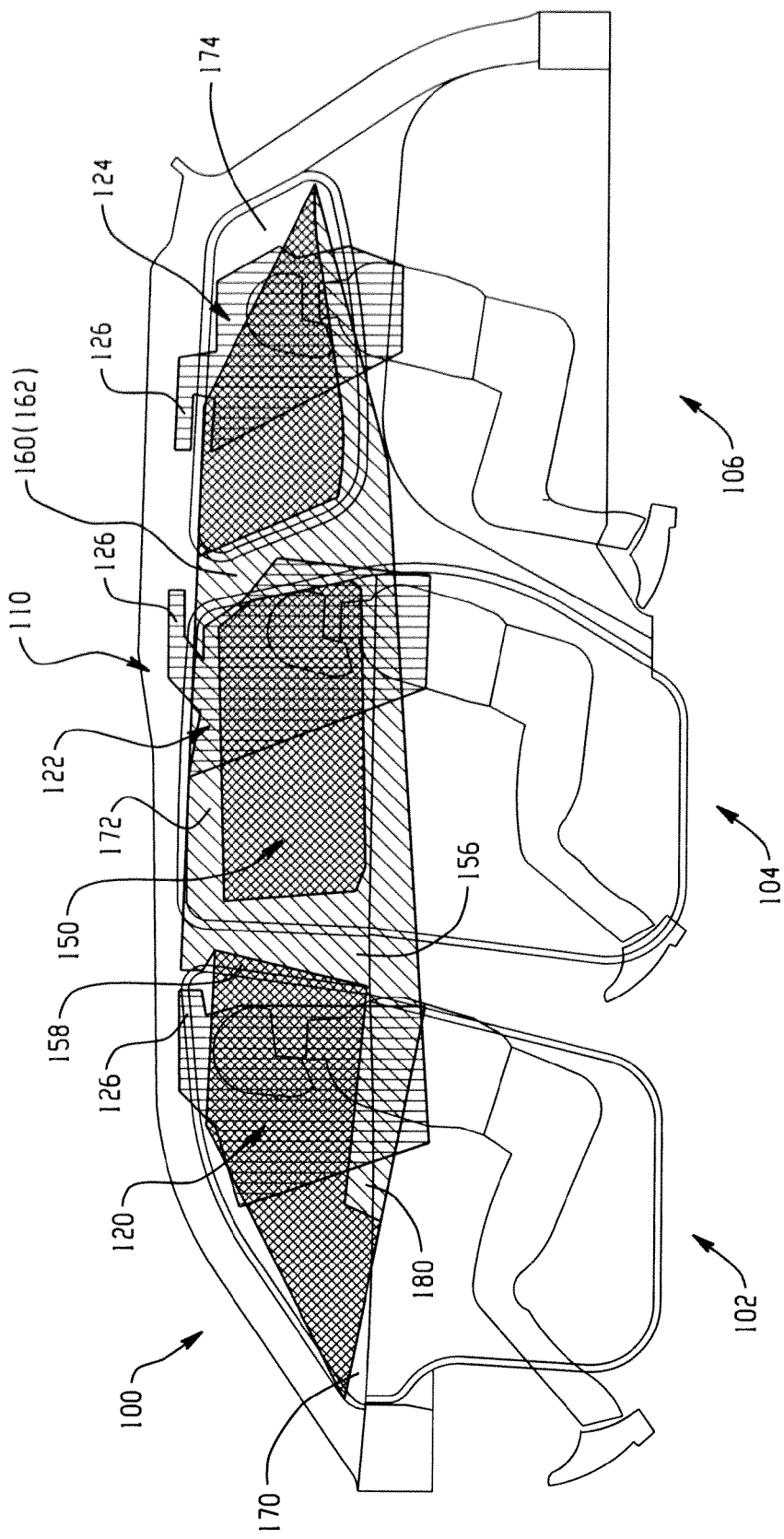
FIG. 1 shows an inflatable side restraint system for an automotive vehicle.

Turning initially to FIG. 1, there is shown a portion of an automotive vehicle 100, and particularly a view of the vehicle illustrating multiple seat rows, namely a first, second, and third rows of seats 102, 104, 106. At each end of each row of seats is provided an inflatable side restraint system or assembly 110. The inflatable side restraint system 110 provides protection to the vehicle occupants, and particularly provides protection in the event of a side crash event. Generally, side restraint systems are known in the art, and additionally side restraint systems having selectively inflatable portions, or that include a curtain or sail panel are also known in the art. These known inflatable portions and/or sail panels cooperate with one or more sensors to detect a rapid deceleration in the transverse direction (i.e. side-to-side direction) and selectively deploy, unfurl, inflate, etc. the side restraint system in order to protect the vehicle occupants. For example, the system can provide protection against undesired contact of the vehicle occupant with an interior portion of the vehicle. Likewise, the system may also provide additional occupant protection relating to objects external to the vehicle and/or ejection protection as is occasionally encountered with a rollover event. The new inflatable side restraint system 110 of the present disclosure offers both types of protection to the occupants and as will become evident below, selected portions of the system contribute to one and/or both types of protection.

Figure 2:
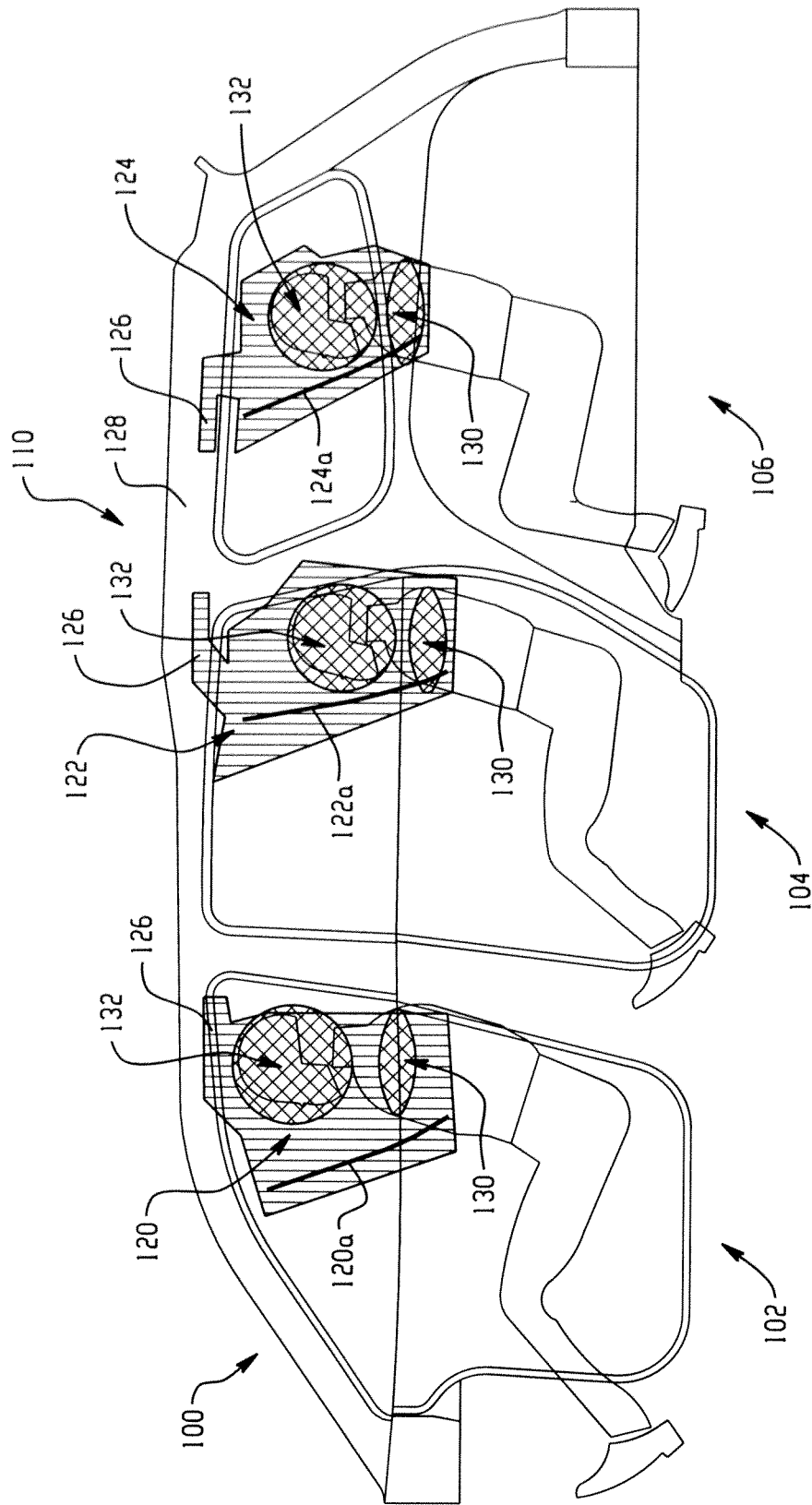
FIG. 2 illustrates one portion of the inflatable side restraint system, including a head-upper thorax restraint assembly for each seat row.

A shown in FIG. 1 and individually illustrated in FIG. 2, the inflatable side restraint system 110 includes first, second, and third head-upper torso/upper thorax restraints 120, 122, 124 disposed at each end of the seat row 102, 104, 106, respectively. More particularly, each of the restraints 120, 122, 124 includes an inflatable restraint cushion that provides head and upper torso/upper thorax protection for a vehicle occupant in a respective row. These head/upper torso cushions 120, 122, 124 are independent and preferably deploy through fill portions 126 provided in a headliner 128 of the vehicle only, and not over the garnish, in order to provide for fast or rapid positioning or deployment. It is also preferable that each of the head/upper torso cushions 120, 122, 124 undergoes a purely outboard roll pattern so that each cushion is positioned as outboard as possible within the vehicle interior. Further, a low coating weight provides for overall lighter weight to the vehicle, faster deployment, and also minimizes the package size of the inflatable restraint cushions. The cell pattern within the each of the inflatable restraint cushions is optimized for position timing and reducing the risk that an inflatable restraint cushion is out of position. For example, reference arrows 120a, 122a, and 124a (FIG. 2) illustrate a quick fill or primary fill path to provide upper thorax protection to the vehicle occupants in the different rows. These fill paths 120a, 122a, 124a quickly deploy and extend the restraint cushions 120, 122, 124 to their full length or extent, i.e., extend downwardly from the headliner to provide at least upper thorax protection, as well as providing head protection. Thus, regions 130 disposed along a lower, base portion of each of the head/upper torso restraint cushions 120, 122, 124 are quickly filled to provide upper thorax protection. In addition, regions 132 are also referred to as secondary fill regions that provide head protection. One skilled in the art will appreciate that the particularly illustrated path for quick deployment that achieves at least both upper thorax and head protection can be altered without departing from the scope and intent of the present disclosure.

Figure 3:
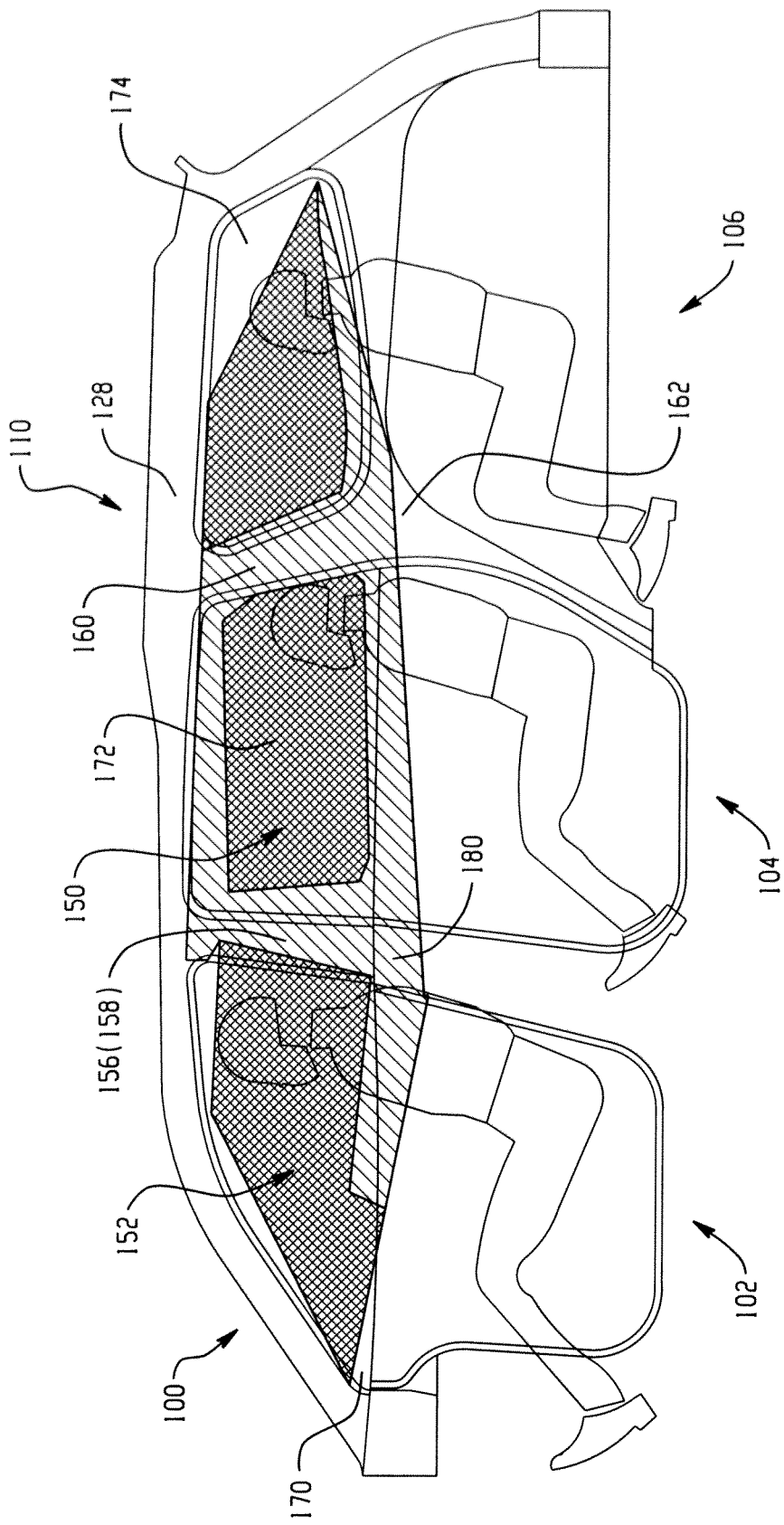
FIG. 3 illustrates another portion of the inflatable side restraint system, namely the sail panel.

With continued reference to FIGS. 1 and 2, the curtain or sail panel 150 of the inflatable side restraint system 110 will be more particularly described in connection with FIG. 3 where the sail panel is individually shown. The sail panel 150 is preferably a generally continuous member that deploys from the headliner 128 and extends continuously from the first row 102, along the second row 104, and to the third row 106 over the entire side of an interior portion of the automotive vehicle 100. The sail panel is a flexible, curtain-like structure 152 that includes inflatable cushion portions 154 at select regions. In particular, the inflatable cushion portions 154 are shown to be in fluid communication with one another and preferably include at a minimum at least one inflatable region 156 substantially located along a first pillar region or B pillar 158 of the vehicle, and preferably a second inflatable region 160 substantially located along a second pillar region or C pillar 162 of the vehicle. As is known in the art, the first and second pillar regions 158, 162 are disposed between a pair of adjacent side windows. For example, the first or B pillar 158 is disposed between a side window 170 associated with the front seat row 102 and side window 172 associate with the second seat row 104. Likewise, the second or C pillar 162 is located between the adjacent side window 172 of the second seat row 104 and rear side window 174 of the third seat row 106. The inflatable regions 156, 160 of the sail plane 150 provide a standoff for the remainder of the flexible curtain and each provide ejection mitigation protection. Of course the inflatable regions 156, 160 also provide a cushion for head-upper torso support.

An additional inflatable region or third inflatable region 180 extends in a direction generally perpendicular to the inflatable regions 156, 160. The third inflatable region 180 forms an inflated lower member or tube that provides tension and standoff from the window plane and mitigates the potential for ejection. In conjunction with the remainder of the sail panel 150, the inflated standoff portions 158, 162 provide ejection mitigation protection along with the lower, inflated third region 180.

As is evident from FIGS. 1-3, the inflatable side restraint system 100 extends substantially along each end of the three rows 102, 104, 106 and advantageously provides a flexible curtain 150 along this entire extent from the headliner 128 to just below a lower belt region associated with the side windows 170, 172, 174. The inflatable regions 156, 160, 180 provide for head and/or upper torso cushioning in the event of a side impact, and particularly along regions such as the B and C pillars. In addition, the inflatable regions 156, 160, 180 also provide ejection mitigation protection since they serve as a standoff for the inner sail panel 150 from the pillars and window plane. The inflated lower tube 180 provides tension to the sail panel 150 that also contributes to ejection mitigation.

Figure 4:
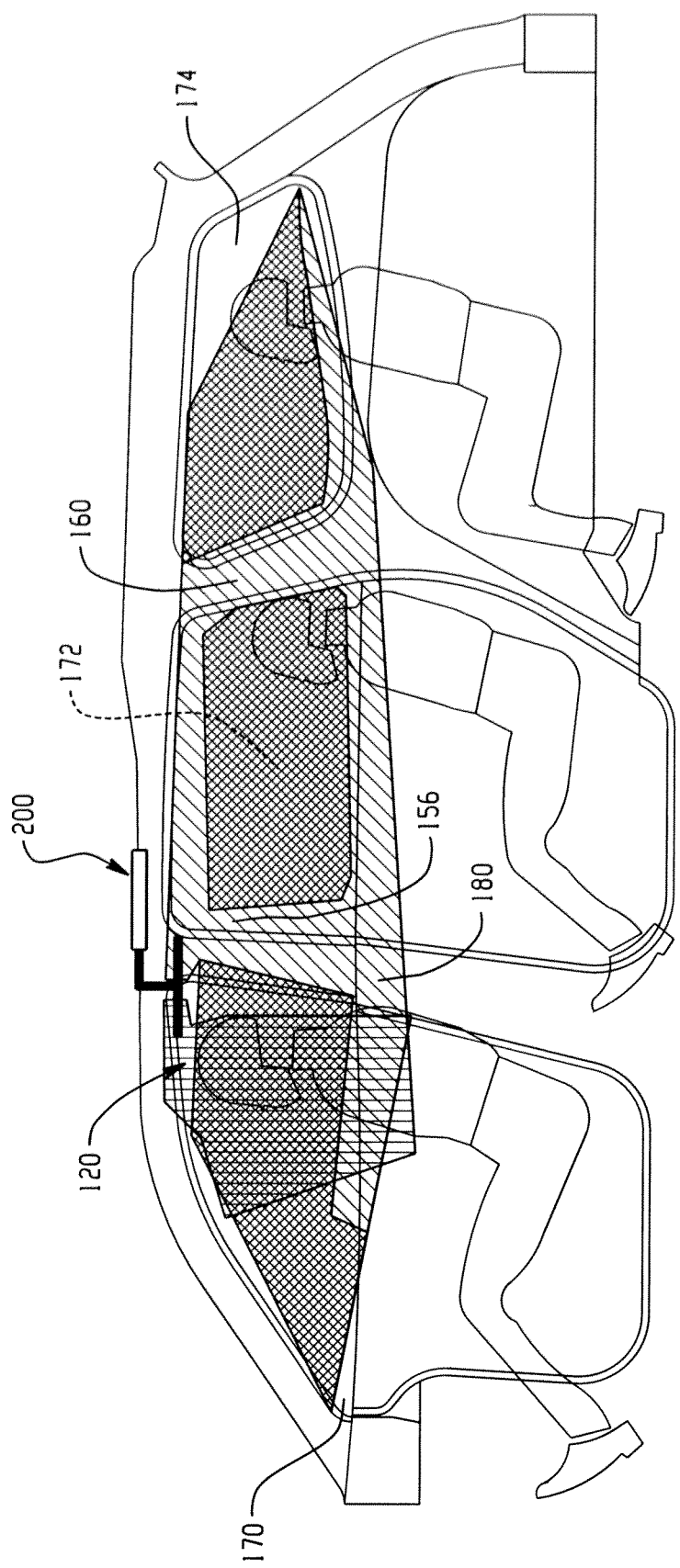
FIG. 4 shows those portions of the inflatable side restraint system in communication with a first inflator.
Figure 5:
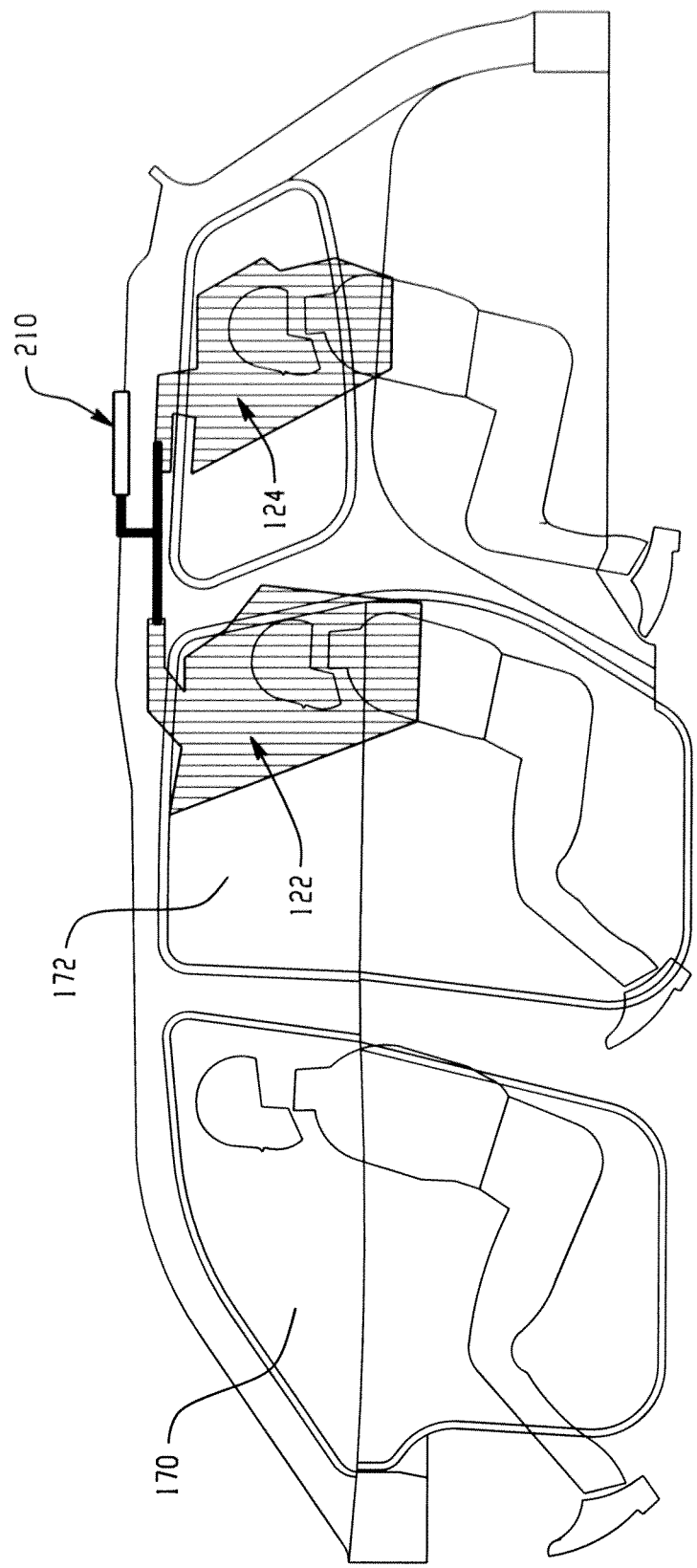
FIG. 5 shows those portions of the inflatable side restraint system in communication with the second inflator.

The inflator layout is more particular illustrated in FIGS. 4 and 5. More particularly, a first inflator 200 (FIG. 4) preferably feeds the front head-upper thorax restraint 120 associated with the front seat row 102. The front inflator 200 also advantageously feeds those inflatable portions of the inner sail panel 150, namely the inflatable pillar regions 156, 160 and the lower tubular portion 180. A second inflator 210 (FIG. 5) feeds the second and third head-upper thorax restraints 122, 124 associated with the second and third rows 104, 106 of seats. Of course this is simply one arrangement for effectively inflating the head-thoracic restraints 120, 122, 124 and the inflatable portions of the sail panel 150, and other arrangements may be used.

Figure 7:
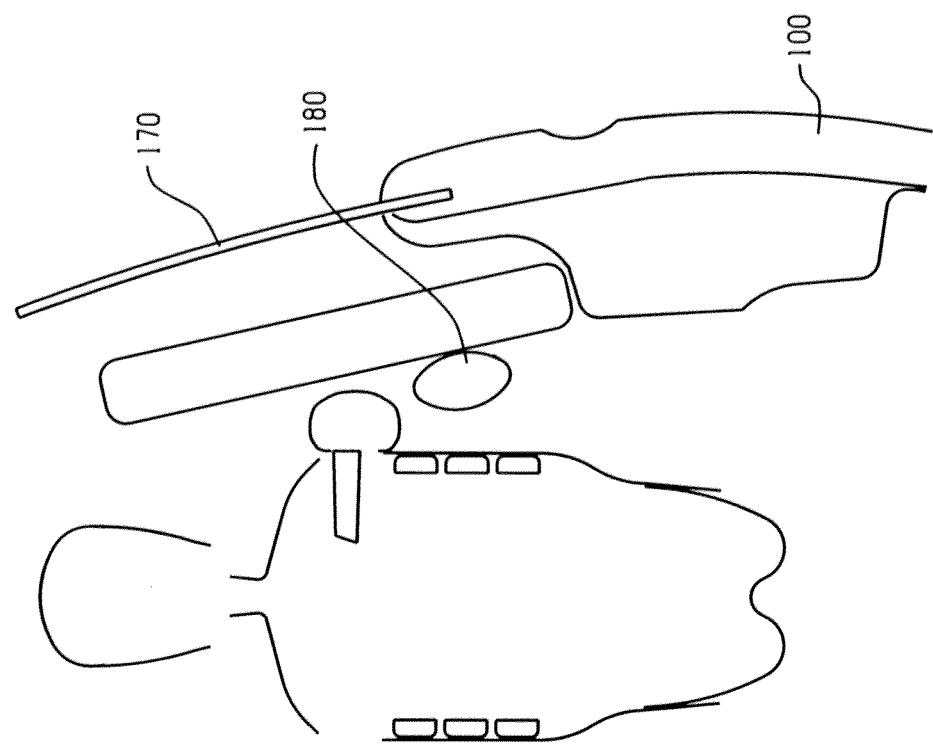
FIG. 7 is a view taken generally along line 7-7 of FIG. 6.
Figure 6:
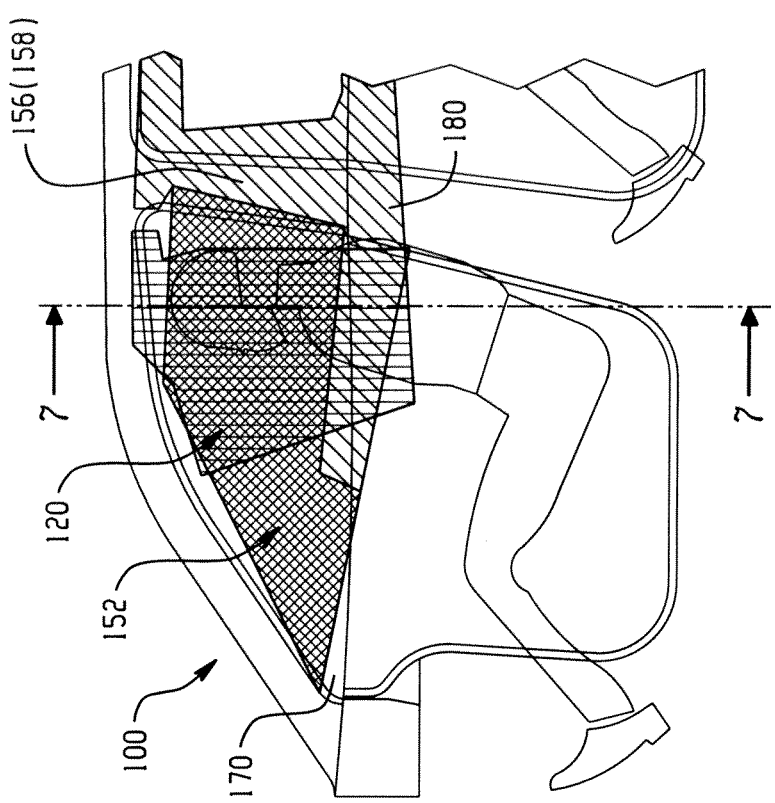
FIG. 6 shows the inflatable side restraint system at the end of one seat row, namely the front row.

FIGS. 6 and 7 more effectively illustrate the location of the sail panel 150 and the inflatable head-thoracic restraints 120, 122, 124 in the interior of the vehicle. Specifically, the sail panel 150 is located inboard of the inflatable restraints 120, 122, 124, i.e. the sail panel is located between the vehicle occupant and the inflatable restraints. Thus, as more particularly evidenced in FIG. 7, the head-upper torso cushions 120, 122, 124 are disposed adjacent the windows/pillars/internal vehicle and door structures to provide standoff for ejection mitigation protection. Likewise, the inflatable portions 156, 160, and more particularly the illustrated lower tube 180, of the sail panel 150 provide additional standoff so that the inner sail panel further provides ejection mitigation protection. This protection can preferably be achieved without providing inflatable restraint systems mounted in the sides of the seats. In this manner, the design and function of the seat can be more developed for other purposes.

The disclosure has been described with reference to a preferred embodiment. However, one skilled in the art will appreciate that modifications and alterations may be made to the disclosure such as the size or orientation of the sail panel and/or the head-upper thorax restraints. Different materials of construction may be also used in manufacture. Likewise, selected aspects of this disclosure may find application in vehicles with only two rows of seats, rather than the illustrated embodiment that has three seating rows. Of course these modifications and others are included so long as the changes fall within the scope of the following claims or the equivalents thereof.

We claim:

1. An inflatable side restraint assembly for a vehicle comprising:
   a sail panel selectively deployed in the vehicle to substantially cover at least front and rear side window regions of the vehicle;
   at least one inflatable region of the sail panel substantially located along a first pillar region between adjacent first and second windows when the sail panel is deployed; and
   an additional inflatable region located along a lower region of the sail panel when the sail panel is deployed and extending in a direction extending between the first pillar region and a second pillar region.

2. The assembly of claim 1 wherein the at least one inflatable region of the sail panel further includes a second inflatable region substantially located along a second pillar region between the second window and an adjacent third window, when the sail panel is deployed, where the second pillar region is spaced from the first pillar region.

3. The assembly of claim 1 wherein the additional inflatable region extends in a direction generally perpendicular to the at least one inflatable region.

4. The assembly of claim 3 wherein the additional inflatable region is in fluid communication with the at least one inflatable region.

5. The assembly of claim 1 further comprising at least one deployable head-upper thorax restraint configured to deploy between the sail panel and an outer end of at least one seat row in the vehicle.

6. The assembly of claim 1 further comprising a head-upper thorax restraint that deploys between the sail panel and the vehicle interior.

7. The assembly of claim 6 wherein there is a head-upper thorax restraint at each end of each row of seats in the vehicle.

8. The assembly of claim 7 wherein each head-upper thorax restraint includes an inflatable cushion.

9. The assembly of claim 8 wherein at least one head-upper thorax restraint is in fluid communication with the at least one inflatable region of the sail panel.

10. The assembly of claim 6 wherein each head-upper thorax restraint includes an inflatable cushion.

11. An inflatable side restraint assembly for a vehicle comprising:
    an inflatable cushion configured to deploy downwardly from along a headliner toward a lower belt region into a vehicle compartment to provide head and upper thorax protection at each end of at least one row of seats; and
    a sail panel separate from the inflatable cushion and disposed inwardly of the inflatable cushion in the vehicle compartment, the sail panel including inflatable portions provided along at least a portion of a pillar and adjacent a lower edge of the sail panel to provide standoff for ejection mitigation protection.

12. The assembly of claim 11 wherein inflatable cushions are provided at each end of each row of seats.

13. The assembly of claim 11 wherein the inflatable pillar and lower edge portions are in fluid communication.

14. The assembly of claim 13 wherein the sail panel extends along a side of the vehicle compartment at the end of each row of seats, and the inflatable portions extend along B and C pillar portions.

15. The assembly of claim 14 wherein the inflatable lower edge portion extends from the front row to the rear row of seats.

16. The assembly of claim 11 further comprising a first inflator that supplies a front row inflatable cushion and the inflatable portions of the sail panel.

17. The assembly of claim 16 further comprising a second inflator that supplies inflatable cushions associated with additional rows.

18. A method of protecting a vehicle occupant during a side crash event comprising:
    selectively deploying a sail panel downwardly from a headliner region to cover at least front and rear side window regions of a vehicle;
    inflating at least a region of the sail panel located in an area along a first pillar region between first and second windows when the sail panel is deployed; and
    inflating a head and upper torso cushion downwardly from a headliner region between the sail panel and an interior of the vehicle, wherein the head and upper torso cushion is distinct from the sail panel region along the first pillar region.

* * * * *